(12) United States Patent
Alonso et al.

(10) Patent No.: US 11,124,712 B2
(45) Date of Patent: Sep. 21, 2021

(54) METHOD OF USING HIGH MOLECULAR WEIGHT AROMATIC POLYOL POLYESTERS AS DEMULSIFIERS FOR CRUDE OIL TREATMENT

(71) Applicant: Dow Global Technologies LLC, Midland, MI (US)

(72) Inventors: Thiago V. Alonso, Lake Jackson, TX (US); Callie M. Ayers, Lake Jackson, TX (US); Stephen M. Hoyles, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/763,839

(22) PCT Filed: Nov. 13, 2018

(86) PCT No.: PCT/US2018/060812
§ 371 (c)(1),
(2) Date: May 13, 2020

(87) PCT Pub. No.: WO2019/099400
PCT Pub. Date: May 23, 2019

(65) Prior Publication Data
US 2020/0362251 A1 Nov. 19, 2020

Related U.S. Application Data

(60) Provisional application No. 62/585,876, filed on Nov. 14, 2017.

(51) Int. Cl.
*C10G 33/04* (2006.01)
*B01D 17/04* (2006.01)
*C08G 65/331* (2006.01)

(52) U.S. Cl.
CPC .......... *C10G 33/04* (2013.01); *B01D 17/047* (2013.01); *C08G 65/3315* (2013.01)

(58) Field of Classification Search
CPC .. C10G 33/04; B01D 17/047; C08G 65/3315; C08G 65/2603
See application file for complete search history.

(56) References Cited

U.S. PATENT DOCUMENTS

| 5,360,900 A | 11/1994 | DeLeon et al. |
| 9,695,366 B2 * | 7/2017 | Bevinakatti ............ C10G 33/04 |

(Continued)

FOREIGN PATENT DOCUMENTS

| DE | 1595320 A1 | 4/1970 |
| EP | 0429892 A2 | 6/1991 |

(Continued)

OTHER PUBLICATIONS

PCT/US2018/060812, International Search Report and Written Opinion dated Jan. 24, 2019.

(Continued)

*Primary Examiner* — Randy Boyer
*Assistant Examiner* — Juan C Valencia

(57) ABSTRACT

A method of demulsifying crude oil, said method comprising the step of reacting an amount of crude oil with a polyester demulsifier, therein the demulsifier is used in quantities from 0.0001% to 5% (1-50,000 ppm), preferably 0.0005% to 2% (5-20,000 ppm), more preferably 0.0008% to 1% (8-10,000 ppm) and most preferably 0.001 to 0.1 wt. % polymer (10-1,000 ppm) related to the oil fraction of the utilized emulsion.

6 Claims, 3 Drawing Sheets

(56) References Cited

U.S. PATENT DOCUMENTS

| | | |
|---|---|---|
| 2004/0059011 A1 | 3/2004 | Barber et al. |
| 2004/0147407 A1* | 7/2004 | Hahn .................... C10L 1/2437 |
| | | 507/200 |
| 2013/0184366 A1 | 7/2013 | Jimenez et al. |
| 2017/0114287 A1 | 4/2017 | Rouse et al. |

FOREIGN PATENT DOCUMENTS

| | | |
|---|---|---|
| WO | 2004/067594 A2 | 8/2004 |
| WO | 2006068702 A2 | 6/2006 |

OTHER PUBLICATIONS

PCT/US2018/060812, International Preliminary Report on Patentability dated May 19, 2020.

* cited by examiner

METHOD OF USING HIGH MOLECULAR WEIGHT AROMATIC POLYOL POLYESTERS AS DEMULSIFIERS FOR CRUDE OIL TREATMENT

CROSS-REFERENCE TO RELATED APPLICATIONS

This application is the U.S. National Stage of International Application No. PCT/US2018/060812, filed on Nov. 13, 2018, which claims the benefit of U.S. Provisional Application Ser. No. 62/585,876, filed on Nov. 14, 2017, the entire contents of both are hereby incorporated by reference.

FIELD OF THE INVENTION

This invention relates generally to the use of demulsifiers for crude oil treatment. More specifically, this invention relates to a method of treatment for crude oil utilizing an aromatic polyol polyester demulsifier, the aromatic polyol polyester being synthesized by reacting high molecular weight, low hydroxyl number polyols with an acid source which is solubilized into the polyol without sublimation or degradation during the reaction process.

BACKGROUND OF THE INVENTION

Demulsifiers, or emulsion breakers, are a class of chemicals used to separate emulsions, such as water in oil. Demulsifiers are commonly used in the processing of crude oil, which is typically produced along with significant quantities of saline water. This water (and salt) must be removed from the crude oil prior to refining. If the majority of the water and salt are not removed, significant corrosion problems can occur in the refining process.

In crude oil applications, demulsifiers are added to the oil/water emulsion and migrate to the oil/water interface, where they rupture or weaken the rigid film, and enhance water droplet coalescence. Optimum emulsion breaking with a demulsifier requires a properly selected chemical for the given emulsion, an adequate quantity of that chemical, adequate mixing of the chemical in the emulsion, and sufficient retention time in separators to settle water droplets. Additional steps may include the addition of heat, electric grids, and/or coalescers to facilitate or completely resolve the emulsion.

Methods of demulsification are known in the art. For example, WO 2006068702 A2 discloses a method of crude oil treatment utilizing demulsifiers synthesized by the polycondensation of poly (tetrahydrofuran) and polyalquilene glycols using adipic acid and p-toluene sulfonic as a catalyst. The reaction was continuously purged with nitrogen at a temperature of around 170° C. Demulsification performance was evaluated through bottle tests which showed superior performance when compared to existing commercial products. In one example, samples of the novel aromatic polyol polyester demulsifier were found to have thief grindout residual emulsion values of between 1.9-4.0 and free water values of 5.0-36.0. The samples were also found to have a water drop value of 40 ml over a period of 60 minutes.

Separately, the synthesis of certain aromatic polyol polyesters is known in the art. U.S. Published Patent Application No. 2004/0059011A1 U.S. Pat. No. 5,360,900 disclose a method of synthesizing an aromatic polyester polyol via a polyol precursor that is divided into 2 steps. In the first step components are heated to a temperature of around 190° C. Heating is then ceased at which point a minimal amount of water purge is observed. In the second step, a vacuum is applied for 2 to 5 hours to remove all the residual water from the system, which in turn increases the conversion of the reaction. Finally a catalyst is added to the reaction to avoid hydrolysis.

US2013/0184366 A1 discloses an alternate method of synthesizing aromatic polyester polyols without the need for a vacuum by utilizing a continuous flow of nitrogen. The nitrogen bath removes distillable by-products from the mixture, however it can also result in the loss of low molecular weight diols such as MEG and DEG. The rate of conversion is monitored during the reaction mainly by sampling the reaction products and measuring acid number. Acidic groups are continuously consumed during the reaction generating ester groups, and low acidity levels are sought in order to improve stability of the synthesized product for longer periods.

While methods of treating crude oil with demulsifiers are disclosed in the art, there remains a need for a method of treating crude oil with demulsifiers that is low-cost, offers superior water drop performance, and minimizes residual (or unresolved) emulsion, compared to known demulsifiers.

SUMMARY OF THE INVENTION

The instant invention discloses the novel treatment of crude oil with aromatic polyol polyester demulsifiers. Aromatic polyol polyester demulsifiers are low-cost, exhibit superior water drop performance, and minimize residual (or unresolved) emulsions over conventional demulsifiers.

A key feature of the method of the invention is the discovery that the synthetized aromatic polyol polyester demulsifiers display enhanced crude oil demulsification performance when compared to the raw polyglycols from which they were synthesized. For example, it was determined that 300 ppm and 400 ppm concentrations of the claimed demulsifier have thief grindout residual emulsion values of approximately 0, and free water values of 6 and 4, respectively, which are superior to methods known in the prior art. Moreover, the samples were also found to have a water drop value of 50 ml over a period of 60 minutes, which is also superior to methods known in the prior art.

Additionally, unlike methods known in the prior art, it was discovered that an aromatic polyol polyester demulsifier could be synthesized by reacting a low hydroxyl number, high molecular weight polyol (such as the DEMTROL™ family of demulsifiers) with a suitable aromatic di-acid that can be solubilized into the polyol, such that minimal or no sublimation or degradation occurred during the reaction process. These results were observed even when the reaction was conducted at high temperatures.

One preferred method of synthesizing, the demulsifier of the invention involves reacting excess moles of polyglycol in relation to aromatic di-acid, most preferably 5 moles of polyglycol to 1 mole of aromatic di-acid. Preferred acidic components are carboxylic acids and carboxylic anhydrides, including phthalic anhydride, terephthalic acid and isophthalic acid, the most preferred being isoplithalic acid. Metallic based catalysts may also be utilized, preferably catalysts such as titanium acetylacetonates, commercial name Tyzor AA 105, and butylstannoic acid, commercial name FASCAT 9100.

The kinetics of the disclosed reaction are evaluated by taking samples from the reaction environment and measuring acidity by titration over time. As the reaction progresses the acid groups react with hydroxyls and generate ester bonds. As the acid groups are consumed, the reaction advances and acidity is decreased at an exponential rate.

The method of the invention results in demulsification of crude oil via an aromatic polyol polyester demulsifier that combines the characteristics of an alkoxylated polymer with aromaticity branching and high molecular weight distribution, which results in superior water drop performance and minimizes residual (or unresolved) emulsion compared to known demulsifiers.

DETAILED DESCRIPTION OF THE PREFERRED EMBODIMENTS

Figure 1:
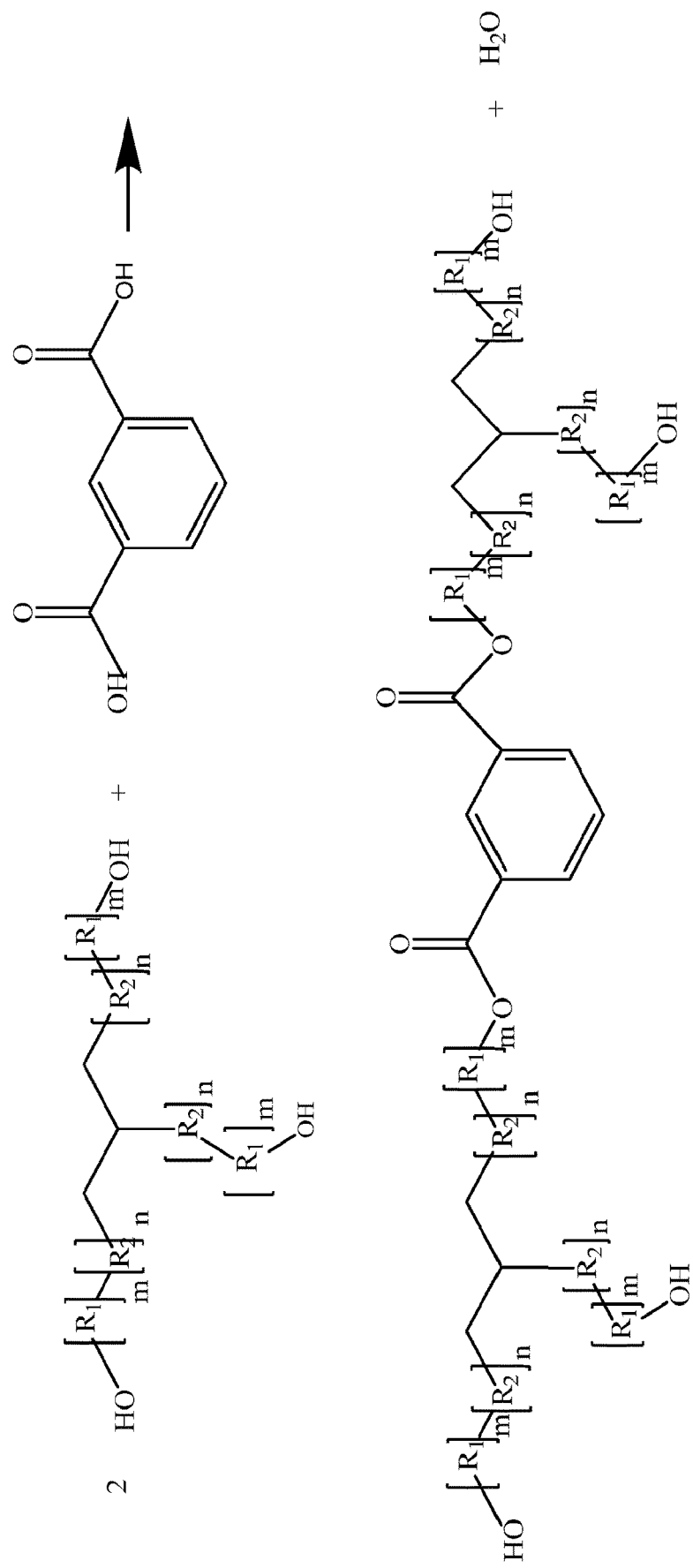
FIG. 1 depicts a synthesis reaction for a disclosed novel demulsifier.

The invention is a method for treatment of crude oil utilizing aromatic polyol polyester demulsifiers which demonstrate superior water drop performance and minimize residual (or unresolved) emulsion compared to regular polyols. The aromatic polyol polyester demulsifiers are synthesized by reacting a high molecular weight, low hydroxyl number polyol with an aromatic di-acid. The synthesis reaction may also incorporate a catalyst. Notably, the aromatic di-acid can be solubilized into the polyol without sublimation or degradation during the reaction process, even when the reaction is conducted at high temperatures (e.g. between 200° C. to 270° C.). As such, the yield of demulsifier from the reaction is preferably greater than 80%, more preferably greater than 90%, and most preferably greater than 95%.

Polyols

The first constituent of the reaction—polyols—are polymers with multiple hydroxyl functional groups available for organic reactions. Monomeric polyols such as glycerin, pentaerythritol, ethylene glycol and sucrose often serve as the starting point for polymeric polyols. These materials are often reacted with propylene oxide or ethylene oxide to produce polymeric polyols.

Polymeric polyols are usually polyethers or polyesters. Polyether polyols are made by reacting epoxides like ethylene oxide or propylene oxide with a multifunctional initiator in the presence of a catalyst, often a strong base such as potassium hydroxide, or a double metal cyanide catalyst such as zinc hexacyanocobaltate-t-butanol complex. In contrast, polyesters are formed by condensation or step-growth polymerization of diols and dicarboxylic acids (or their derivatives), for example diethylene glycol reacting with phthalic acid.

One subclass of polyethers are known as polyglycols. Polyglycols are polyether diols and include polyethylene glycol, polypropylene glycol, poly(tetramethylene ether) glycol, and polyalkylene glycols. Of these, polyalkylene glycols (PAGs) are preferred polyols for the claimed invention, as they are inexpensive and have multiple functional groups to promote cross-linking. PAGs are typically synthesized by reacting an initiator such as glycerol, monopropylene glycol, and monoethylene glycol, or other glycols having the generic formula $R(OH)_2$, with ethylene oxide (EO) and/or propylene oxide (PO). Butylene oxide, as well as a catalyst, may also be incorporated.

An example chemical structure of a PAG is depicted below:

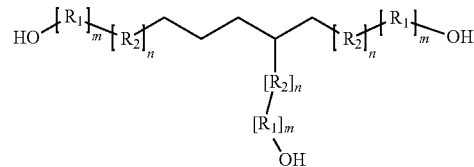

wherein $R_1$ is an ethylene oxide (EO) group having the chemical formula:

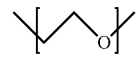

$R_2$ is a propylene oxide (PO) group having the chemical formula:

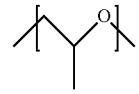

m is the amount of EO, and n is the amount of PO. As shown above, the example PAG has three functional groups.

Since the amount of EO and PO in a PAG synthesis reaction can vary, the structure of the synthesized PAG product varies as well. Common variants of PAGs include homo-polymers of EO, homo-polymers of PO, block copolymers of EO/PO, and reverse block copolymers of EO/PO. PAGs can also be linear or branched. Branching may be generated by using polyglycols initiated by sorbitols, sucrose, and other initiators with high hydroxyl functionality. Given these varying structures, PAGs may be designed for a wide range of molecular weights, viscosities and functional performances.

For the disclosed invention, the preferred wt. % of EO is between 5 wt. % to 100 wt. % of the functional groups, with the corresponding wt. % of PO being between 95 wt. % to 0 wt. % of the functional groups. More preferably, the wt. % of EO is between 10 wt. % to 90 wt. of the functional groups, with the corresponding wt. % of PO being between 90 wt. % to 10 wt. % of the functional groups. Finally, the wt. % of EO is most preferably between 20 wt. % to 80 wt. % of the functional groups, with a corresponding wt. % of PO being between 80 wt. % to 20 wt. % of the functional groups. The molecular weight of PAG should range from 200 g/mol to 10,000 g/mol, preferably around 1,000 g/mol to 5,000 g/mol, and most preferably 1,500 g/mol to 2,500 g/mol.

Besides PAG, other polymeric polyols that result in a polyether having 2, 3, or more functional groups may also be utilized to synthesize the disclosed novel demulsifier.

Aromatic Di-Acid

Aromatic di-acids comprise two acidic functional groups as well as at least one aromatic hydrocarbon. It was determined that aromatic di-acids suitable for the claimed invention should contain at least 2 carboxylic acid or organic acid anhydride groups attached to at least one benzene ring. Moreover, aromatic carboxylic acids with functionality superior or equal to 3 functional groups are preferred.

One class of di-acids that meets these requirements is known as aromatic dicarboxylic acids. Members of this class include phthalic acid, isophthalic acid, terephthalic acid, diphenic acid and 2,6-naphthalenedicarboxylic acid. Of these, isophthalic acid is the preferred aromatic di-acid for the disclosed invention, as it displayed superior solubility with polyalkylene glycol and faster kinetics for esterification. The chemical structure of isophthalic acid is as follows:

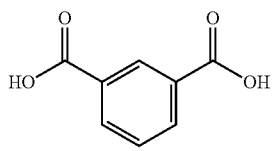

Catalyst

As discussed above, the disclosed invention may also include a catalyst. Catalysts accelerate the reaction rate of the chemical reaction by altering the reaction mechanism. Typically the catalyst is regenerable and/or is not itself affected by the reaction. Metallic based catalysts were determined to be most effective in the disclosed invention, preferably titanium acetylacetonates, commercial name Tyzor® AA 105, and butylstannoic acid, commercial name FASCAT® 9100, and most preferably FASCAT® 9100. Tyzor® AA 105 has the following chemical structure:

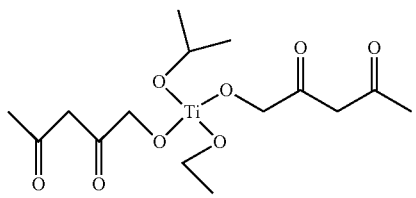

Whereas the chemical structure of FASCAT® 9100 is as follows:

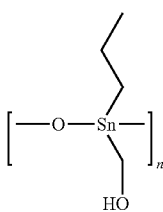

Demulsifier Synthesis

Demulsifiers are typically synthesized from the reaction of acid catalyzed phenol-formaldehyde resins, base catalyzed phenol-formaldehyde resins, epoxy resins, polyethyleneimines, polyamines, di-epoxides, polyols, and/or dendrimers. Demulsifiers are typically formulated with polymeric chains of ethylene oxides and polypropylene oxides of alcohol, ethoxylated phenols, ethoxylated alcohols and amines, ethoxylated resins, ethoxylated nonylphenols, polyhydric alcohols, and sulphonic acid salts. In particular, the addition of ethylene oxide increases water solubility, whereas the addition of propylene oxide decreases water solubility.

Factors affecting demulsifier performance in crude oil include temperature, pH/acidity, the type of crude oil being demulsified, the composition of the brine/salt water, and droplet size and distribution. An increase in temperature results in a decrease in emulsion stability, and, hence, a lower dosage of demulsifier is required. pH also affects demulsifier performance. Generally, basic pH promotes oil-in-water emulsions and acidic pH produces water-in-oil emulsions. High pH, therefore, helps in destabilizing water-in-oil emulsions.

An example of the claimed reaction scheme between a PAG and isophthalic acid is depicted in FIG. 1, wherein $R_1$ is EO, $R_2$ is PO, m is the amount of EO, and n is the amount of PO. A preferred stoichiometric ratio of this reaction is 2 moles of polyalkylene glycol to 1 mole of isophthalic acid. However the most preferred ratio found to optimize the solubilization of isophthalic acid with polyalkylene glycol is 5 moles of polyalkylene glycol to 1 mole of isophthalic acid. Depending on the makeup of the PAG precursor, the resulting demulsifier may have EO/PO blocks comprising homo-polymers of EO, homo-polymers of PO, block copolymers of EO/PO, reverse block copolymers of EO/PO, or a mixture of block types. The EO/PO blocks of the demulsifier may also be linear or branched, and are preferably branched. The molecular weight of the synthesized demulsifier ranges between about 200 g/mol to about 100,000 g/mol.

Additionally, and as discussed above, the reagents for the aromatic polyol polyester reaction can be polymeric polyols other than PAG and aromatic di-acids other than isophthalic acid. The generic chemical formula for an aromatic polyol polyester demulsifier synthesized from this reaction is as follows:

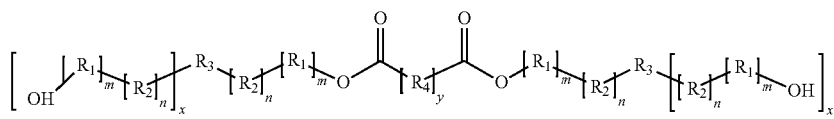

wherein $R_1$ is EO, PO or mixtures thereof; $R_2$ is PO, EO, or mixtures thereof; $R_3$ is a polyol with (x+1) functional groups; $R_4$ is an aromatic hydrocarbon; $m \geq 1$; $n \geq 0$; $x \geq 0$; and $y \geq 1$.

Figure 2:
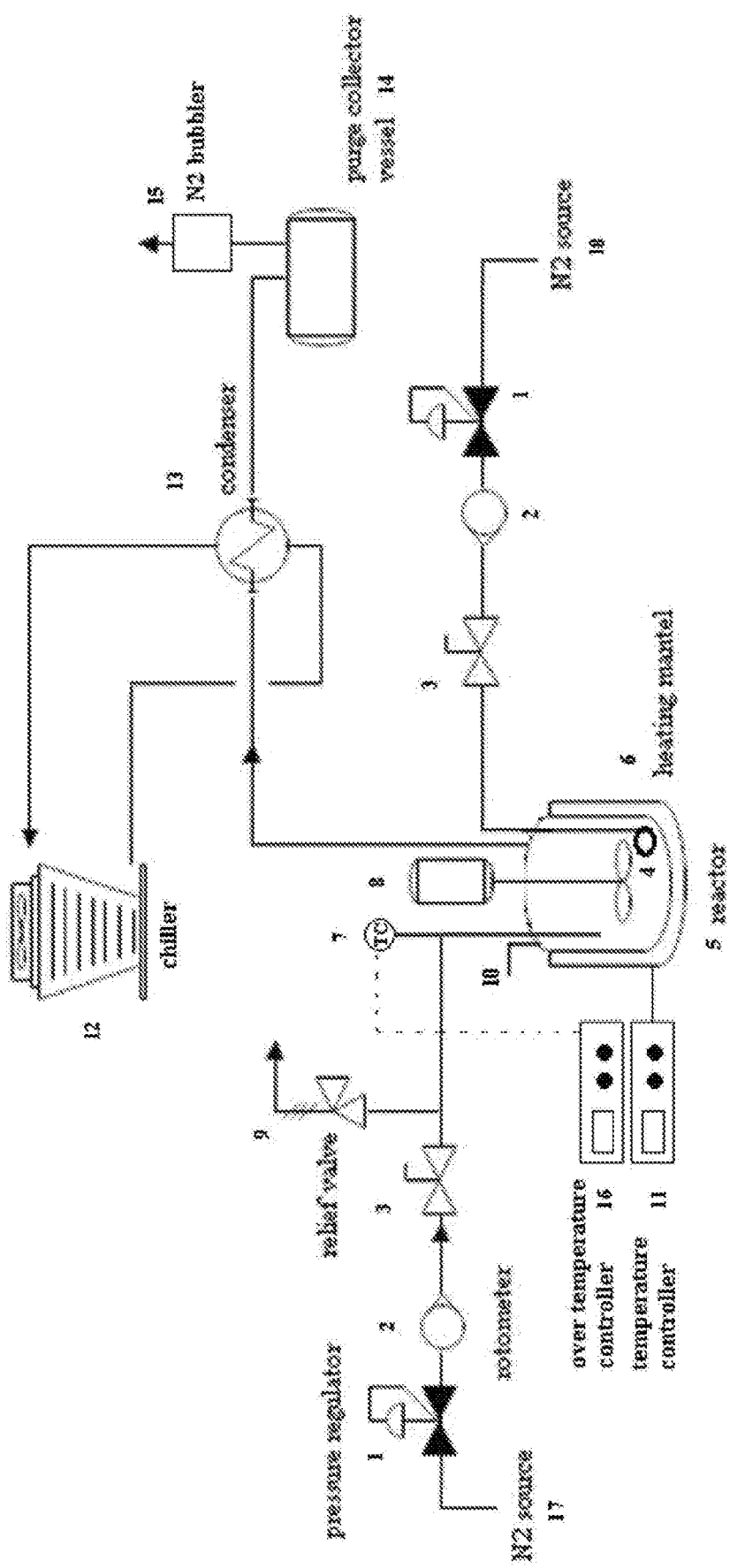
FIG. 2 depicts an apparatus for production of a disclosed novel demulsifier.

The reaction system to generate the example aromatic polyol polyester demulsifiers is depicted in FIG. 2. In the first step, isophthalic acid and PAG are loaded together in reactor 5 and heated to between approximately 100° C.-150° C., preferably approximately 120° C. The temperature in reactor 5 is controlled by temperature controller 11. Additionally an over temperature controller 16 may be used to provide redundancy in the event temperature controller 11 fails. While being heated isophthalic acid and PAG are agitated in reactor 5 by mixer 4. Once the desired temperature in reactor 5 is reached the catalyst (preferably Tyzor® AA105 or FASCAT® 9100) is added to reactor 5 and agitation by mixer 4 continues. The concentration of the catalyst is preferably about 0.01 wt. % to 0.1 wt. % of the initial mixture of isophthalic acid and PAG, and more preferably 0.03 wt. %.

After addition of the catalyst is complete, the mixture is maintained at approximately 100° C.-150° C., preferably approximately 120° C., and agitated for approximately 45-75 minutes, preferably approximately 60 minutes, to allow adequate miscibility of the components. Once complete, the temperature in reactor 5 is raised to approximately 200° C.-235° C., preferably approximately 235° C. The reaction progress is monitored through the measurement of the acid number via an autotitrator. The reaction is considered complete when conversion of the limiting reactant, i.e. the aromatic di-acid, is above approximately 90%, preferably above approximately 95%, resulting in a reduction of acid number (mg KOH/g) by greater than approximately 89%, preferably greater than approximately 94%.

During the reaction process expelled water is purged from the system via nitrogen gas supplied from nitrogen source 17, which is flowed above reactor 5 and nitrogen source 18 which is bubbled into reactor 5, the flow of nitrogen being controlled by pressure regulator 1. The spent nitrogen is then transferred to condenser 13, which is chilled via chiller 12, and the expelled water and/or contaminants are collected in purge collector vessel 14. The continuing flow of nitrogen is confirmed via monitoring $N_2$ bubbler 15.

Method of Use

After the reaction is completed, the demulsifier may be utilized as a crude oil emulsion breaker. In one embodiment of the claimed method, crude oil is extracted from a well and is transported to a dehydration plant. Depending on the method of extraction (for example water injection), the crude oil may be mixed with saline water. Alternatively the crude oil may naturally contain water. In either instance it is necessary for the crude oil to have the water removed before further processing can occur.

As the crude oil progresses through the dehydration plant it is exposed to an aromatic polyol polyester demulsifier, preferably in solution and preferably at an elevated temperature. The demulsifier is used in quantities from 0.0001% to 5% (1-50,000 ppm), preferably 0.0005% to 2% (5-20,000 ppm), more preferably 0.0008% to 1% (8-10,000 ppm) and most preferably 0.001 to 0.1 wt. % polymer (10-1000 ppm) related to the oil fraction of the utilized emulsion. Once demulsification is complete the separated dry oil is removed from the dehydration plant and may be transported for further refining.

Efficacy of the demulsifier may be determined by exposing samples of crude oil to demulsifiers in reaction chambers such as demulsification glasses. After approximately 60 minutes, the treated crude oil will have separated into a bottom water layer, a middle emulsion layer (i.e. the oil/water interface) and a top oil layer. A sample of the emulsion layer is removed (known as the "thief cut"), placed in a centrifuge tube (preferably an ASTM-approved conical centrifuge tube) and treated with a starter solvent such as kerosene. After shaking the tube to evenly distribute the starter solvent, the tube is centrifuged for approximately 10 minutes. Once centrifugation is finished, the separated water is removed and measured (hereinafter referred to as "free water," "W," or "Water 1"). Once this is complete, knock out drops (Tetrolite F46) are added to the remaining emulsion and the emulsion is centrifuged a second time. After the second centrifitgation is complete, a second separated water volume is removed (hereinafter "Water 2").

Using the "Water 1" and "Water 2" measurements, the base sediment (B.S.)—i.e. the unresolved emulsion—is calculated according to the following equation:

$$B.S. = (\text{Water 2} - \text{Water 1}) \times 2$$

In addition to the "thief cut," the efficacy of the demulsifier may also be measured by obtaining a "composite cut" which can be obtained by again treating crude oil with demulsifier for 60 minutes, and then manually removing all separated water from the demulsification glass. A sample of the crude oil is then removed and centrifuged according to the same procedure as the thief cut, and B.S. and W measurements are obtained.

It was determined from measuring crude oil treated by the claimed demulsifier that the claimed demulsifier offers superior water drop performance and minimizes residual (or unresolved) emulsion.

Working Examples

The following examples illustrate various representative attributes of the invention but should in no way be construed as limiting.

An aromatic polyol polyester of high molecular weight was prepared using 875.12 grams of a polyalkylene glycol EO/PO copolymer, with 40% EO by weight in composition (commercial name DEMTROL™ 1040), 11.64 grams of isophthalic acid and 0.27 grams of Tyzor® AA 105. The acid and the polyalkylene glycol were mixed together at room temperature and $N_2$ bubbling was conducted in order to remove all air from the reaction flask. Temperature was increased to 120° C. and the catalyst was added using a funnel to the reactor. $N_2$ flow was increased after the addition of catalyst to avoid further oxidation. After 30 minutes of homogenization, the temperature was set to 235° C. Some water could be observed at the condenser when temperature reached the desired level. Samples of 5 ml were collected at each hour when temperature stabilized at 235° C. After cooling the samples, acid number measurement was conducted according to DOWM 100387-TE95A. It was desired to get a reduction of initial acidity around 95% to achieve the desired conversion.

The reaction was monitored by the acid number titration. The results observed are detailed in Table 1 below.

TABLE I

| Sample | Reaction time (minutes) | Reactor Temperature (° C.) | Acid Number (KOH mg/g) |
|---|---|---|---|
| 1 | 60 | 197 | 7.58 |
| 2 | 120 | 231 | 6.57 |
| 3 | 980 | 231 | 0.66 |
| 4 | 1055 | 231 | 0.52 |
| 5 | 1130 | 231 | 0.44 |
| 6 | 1205 | 231 | 0.39 |
| 7 | 1300 | 231 | 0.28 |

Acidity was reduced by 96.3%, indicating an optimal conversion of isophthalic acid, the limiting reagent.

A final characterization of the material produced was accomplished utilizing Gel Permeation Chromatography (GPC) with ultraviolet (UV), refractive index (RI) detector and Fourier-transform infrared spectroscopy (FTIR). The molecular weight distribution showed 3 peaks formed. The first and highest molecular weight peak showed a composition of 5.3% of the final product with Mn equal to 15334 Da and Mw equal to 15830 Da. The second peak was determined to be 23.6% of final composition with Mn equal to 9092 Da and Mw 9284 Da. The last peak of low molecular weight was unreacted polyglycol, with 71.1% of the final composition with Mn equal to 3767 Da and Mw equal to 4314 Da. As the polyglycol was in excess in this system, it resulted in a system with 30% of polyol polyester and 70% of non-reacted polyglycol in the final mixture. Inclusion of isophthalic acid in polymeric backbone was identifiable using UV absorption at 240 nm.

The efficacy of the aromatic polyol polyester was determined by measuring the water separation of the crude oil emulsion as a function of time, as well as the drainage of the oil. For that, 1.00 mL of the crude oil emulsion was filled in demulsification glasses (conical, graduated glass bottles). The water content of the emulsion was 50%. In each glass a defined quantity of demulsifier was added with a micro pipette slightly under the surface of the oil emulsion. The demulsifier was mixed in by intensive shaking into the emulsion. Afterwards the demulsification glasses were placed into a bath at moderate temperature 80° C. and the water separation was observed.

After 60 minutes of emulsion breaking, samples of the oil were taken from the oil/water interface of the demulsification glass (the thief cut) and the water content was determined according to ASTM D 96. First, the samples were diluted in kerosene and centrifuged for 10 minutes using approved ASTM conical centrifuge tubes. After centrifugation was complete the volume of water separated was removed and the free water or "Water 1" was measured. Next, knock out drops (Tetrolite F46) were added and the samples were centrifuged for 10 more minutes, after which the separated water volume was removed and the "Water 2" was measured.

Base sediment (B.S.), was calculated according to the equation:

$$B.S. = (\text{Water 2} - \text{Water 1}) \times 2$$

Separately, samples of demulsified oil in which the water was first manually drained (the composite cut) were also obtained and centrifuged. From these samples B.S. and W values were also obtained.

Figure 3:
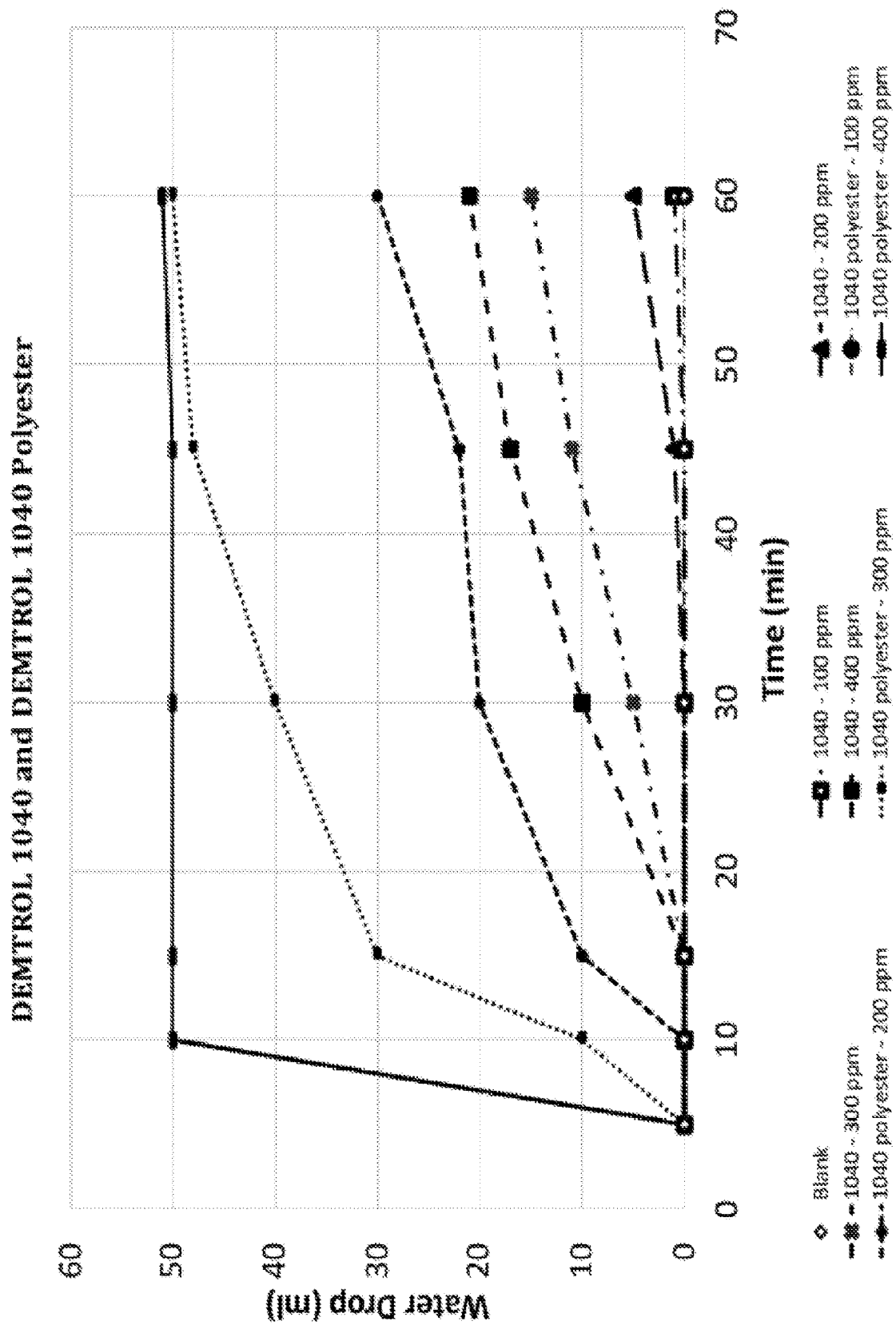
FIG. 3 is a chart depicting water drops over time of a disclosed novel demulsifier compared to DEMTROL 1040 demulsifier.

Dosages of 100 ppm to 400 ppm of the novel aromatic polyol polyester demulsifier (hereinafter referred to as "DEMTROL 1040 Polyester") were compared to equal dosages of standard demulsifiers (in this instance, DEMTROL 1040). The water drops over time of the various demulsifiers were measured and are depicted in Table II and FIG. 3.

TABLE II

| Sample | Water Drop @5 Min | Water Drop @10 Min. | Water Drop @15 Min. | Water Drop @30 Min. | Water Drop @45 Min. | Water Drop @60 Min. |
|---|---|---|---|---|---|---|
| Blank | 0 | 0 | 0 | 0 | 0 | 0 |
| 1040-100 ppm | 0 | 0 | 0 | 0 | 0 | 1 |
| 1040-200 ppm | 0 | 0 | 0 | 0 | 1 | 5 |
| 1040-300 ppm | 0 | 0 | 0 | 5 | 11 | 15 |
| 1040-400 ppm | 0 | 0 | 0 | 10 | 17 | 21 |
| 1040 polyester-100 ppm | 0 | 0 | 0 | 0 | 0 | 0 |
| 1040 polyester-200 ppm | 0 | 0 | 10 | 20 | 22 | 30 |
| 1040 polyester-300 ppm | 0 | 10 | 30 | 40 | 48 | 50 |
| 1040 polyester-400 ppm | 0 | 50 | 50 | 50 | 50 | 51 |

Further, the residual emulsion (BS) and free water (W) values for the thief and composite grindouts for the various demulsifiers were measured and are depicted in Table III.

TABLE III

| | Thief Grindout | | Composite Grindout | |
|---|---|---|---|---|
| | B.S. | W | B.S. | W |
| Blank | 70 | 0 | 70 | 0 |
| 1040 - 100 ppm | 60 | 0.6 | 62 | 2.5 |
| 1040 - 200 ppm | 54 | 0.4 | 62 | 4 |
| 1040 - 300 ppm | 48 | 0.4 | 58 | 8 |
| 1040 - 400 ppm | 42 | 0.4 | 38 | 12 |
| 1040 polyester - 100 ppm | 50.4 | 2.8 | 56 | 14 |
| 1040 polyester - 200 ppm | 28 | 1.6 | 18 | 20 |
| 1040 polyester - 300 ppm | 0 | 6 | 1 | 6 |
| 1040 polyester - 400 ppm | 0 | 4 | 1 | 4 |

As the above tables and figures show, the novel demulsifier (i.e. the aromatic polyester of DEIMTROL™ 1040) showed faster water drop in all dosages evaluated compared to conventional DEMTROL™ 1040. The 300 ppm and 400 ppm concentrations of the novel demulsifiers had B.S. values of approximately zero, as well as free water values of 6 and 4, respectively, both of which are superior to demulsifiers known in the art. Moreover, the samples were also found to have a water drop value of at least 50 over a period of 60 minutes, which is also superior to methods known in the art.

Although the invention has been described by reference to its preferred embodiments as is disclosed in the specification and drawings above, many more embodiments of the invention are possible without departing from the invention. Thus, the scope of the invention should be limited only by the appended claims.

What is claimed is:

1. A method of demulsifying crude oil, said method comprising the step of:
reacting an amount of crude oil with a demulsifier, wherein said demulsifier has the chemical formula:

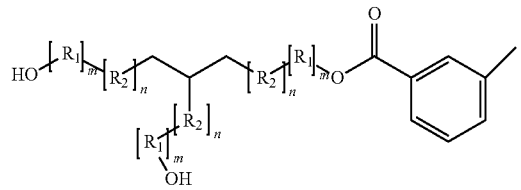

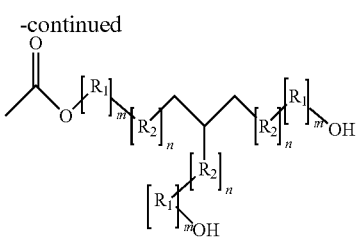

Wherein $R_1$ is EO, PO or mixtures thereof; $R_2$ is PO, EO, or mixtures thereof; $m \geq 1$; and $n \geq 0$.

2. The method of claim 1, wherein said demulsifier is added to the crude oil at a concentration of about 1-50,000 ppm.

3. The method of claim 1, wherein said demulsifier is added to the crude oil at a concentration of about 5-20,000 ppm.

4. The method of claim 2, wherein said demulsifier is added to the crude oil at a concentration of about 8-10,000 ppm.

5. The method of claim 3, wherein said demulsifier is added to the crude oil at a concentration of about 10-1,000 ppm.

6. The method of claim 1, wherein the molecular weight of the demulsifier is between about 200 g/mol to about 100,000 g/mol.

* * * * *